United States Patent
Clement et al.

(10) Patent No.: US 10,636,199 B2
(45) Date of Patent: Apr. 28, 2020

(54) DISPLAYING AND INTERACTING WITH SCANNED ENVIRONMENT GEOMETRY IN VIRTUAL REALITY

(71) Applicant: Google Inc., Mountain View, CA (US)

(72) Inventors: Manuel Christian Clement, Felton, CA (US); Thor Lewis, San Francisco, CA (US); Stefan Welker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/655,491

(22) Filed: Jul. 20, 2017

(65) Prior Publication Data

US 2018/0025534 A1    Jan. 25, 2018

Related U.S. Application Data

(60) Provisional application No. 62/364,548, filed on Jul. 20, 2016.

(51) Int. Cl.
| | | |
|---|---|---|
| *G06T 15/50* | (2011.01) | |
| *G06F 3/00* | (2006.01) | |
| *G06F 3/01* | (2006.01) | |
| *G06F 3/0481* | (2013.01) | |

(52) U.S. Cl.
CPC .......... *G06T 15/506* (2013.01); *G06F 3/011* (2013.01); *G06F 3/012* (2013.01); *G06F 3/04815* (2013.01); *G06F 3/013* (2013.01); *G06T 2215/16* (2013.01)

(58) Field of Classification Search
CPC ......... G06T 11/00; G06T 13/20; G06T 15/00; G06T 15/20; G06T 15/506; G06T 19/00; G06T 19/003; G06T 19/006; G06T 2215/16; G06F 3/011; G06F 3/04815;
(Continued)

(56) References Cited

U.S. PATENT DOCUMENTS

| | | | | |
|---|---|---|---|---|
| 5,900,849 A | * | 5/1999 | Gallery | G06F 3/011 273/148 B |
| 9,259,651 B1 | * | 2/2016 | Yano | A63F 13/40 |
| 9,754,167 B1 | * | 9/2017 | Holz | G06K 9/00671 |
| 2003/0002712 A1 | * | 1/2003 | Steenburgh | G06K 9/00778 382/103 |

(Continued)

FOREIGN PATENT DOCUMENTS

WO    2013/052855 A2    4/2013

OTHER PUBLICATIONS

International Search Report and Written Opinion for PCT Patent Application No. PCT/US2017/043111, dated Sep. 18, 2017, 15 pages.

(Continued)

*Primary Examiner* — Tapas Mazumder
(74) *Attorney, Agent, or Firm* — Brake Hughes Bellermann LLP

(57) ABSTRACT

Techniques of displaying a virtual environment in a HMD involve generating a lighting scheme within a virtual environment configured to reveal a real object in a room in the virtual environment in response to a distance between a user in the room and the real object decreasing while the user is immersed in the virtual environment. Such a lighting scheme protects a user from injury resulting from collision with real objects in a room while immersed in a virtual environment.

19 Claims, 7 Drawing Sheets

(58) Field of Classification Search
CPC ......... G06F 3/012; G06F 3/013; G02B 27/01; G02B 27/017
USPC ........................................................ 345/426
See application file for complete search history.

(56) References Cited

U.S. PATENT DOCUMENTS

| | | |
|---|---|---|
| 2010/0060648 A1 | 3/2010 | Carter et al. |
| 2011/0225514 A1* | 9/2011 | Goldman ............ G06F 3/04815 715/757 |
| 2011/0273448 A1 | 11/2011 | Geraci et al. |
| 2012/0013613 A1* | 1/2012 | Vesely .................... G06F 3/011 345/419 |
| 2012/0188243 A1* | 7/2012 | Fujii ....................... G06T 19/20 345/426 |
| 2013/0235073 A1* | 9/2013 | Jaramillo ................. G09G 5/00 345/619 |
| 2013/0335301 A1* | 12/2013 | Wong .................. G02B 27/0093 345/8 |
| 2015/0231490 A1* | 8/2015 | Graepel ............... H04N 13/207 463/33 |
| 2015/0309578 A1* | 10/2015 | McCoy .................. G06F 3/017 715/863 |
| 2016/0041391 A1 | 2/2016 | Van Curen et al. |
| 2016/0171771 A1* | 6/2016 | Pedrotti ............... G02B 27/017 345/633 |
| 2016/0217616 A1* | 7/2016 | Kraver .................... G06F 3/012 |
| 2016/0314624 A1* | 10/2016 | Li ........................... G06F 1/163 |
| 2017/0330378 A1* | 11/2017 | Kinstner ................. G06T 17/10 |

OTHER PUBLICATIONS

International Preliminary Report on Patentability for International Application No. PCT/US2017/043111, dated Jan. 31, 2019, 11 pages.

* cited by examiner

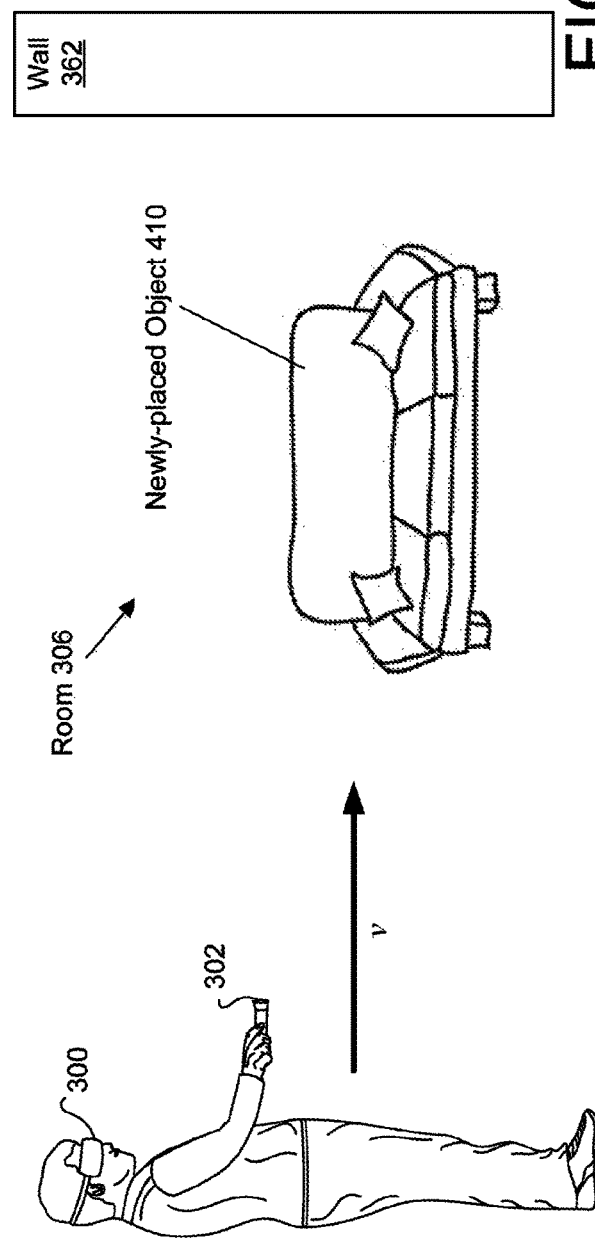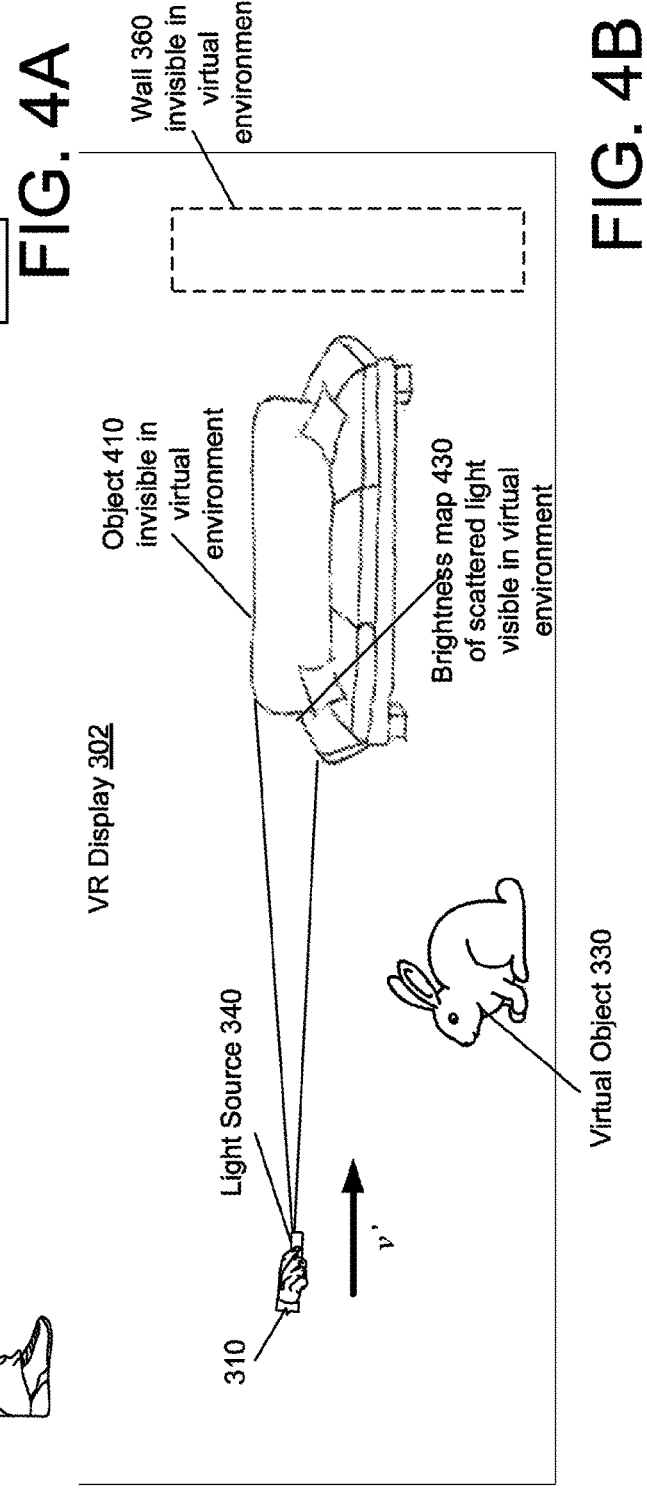

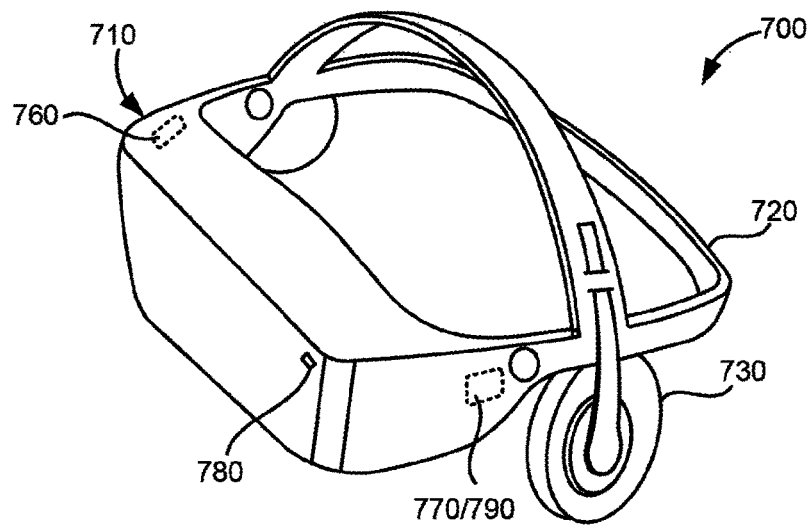
FIG. 7A
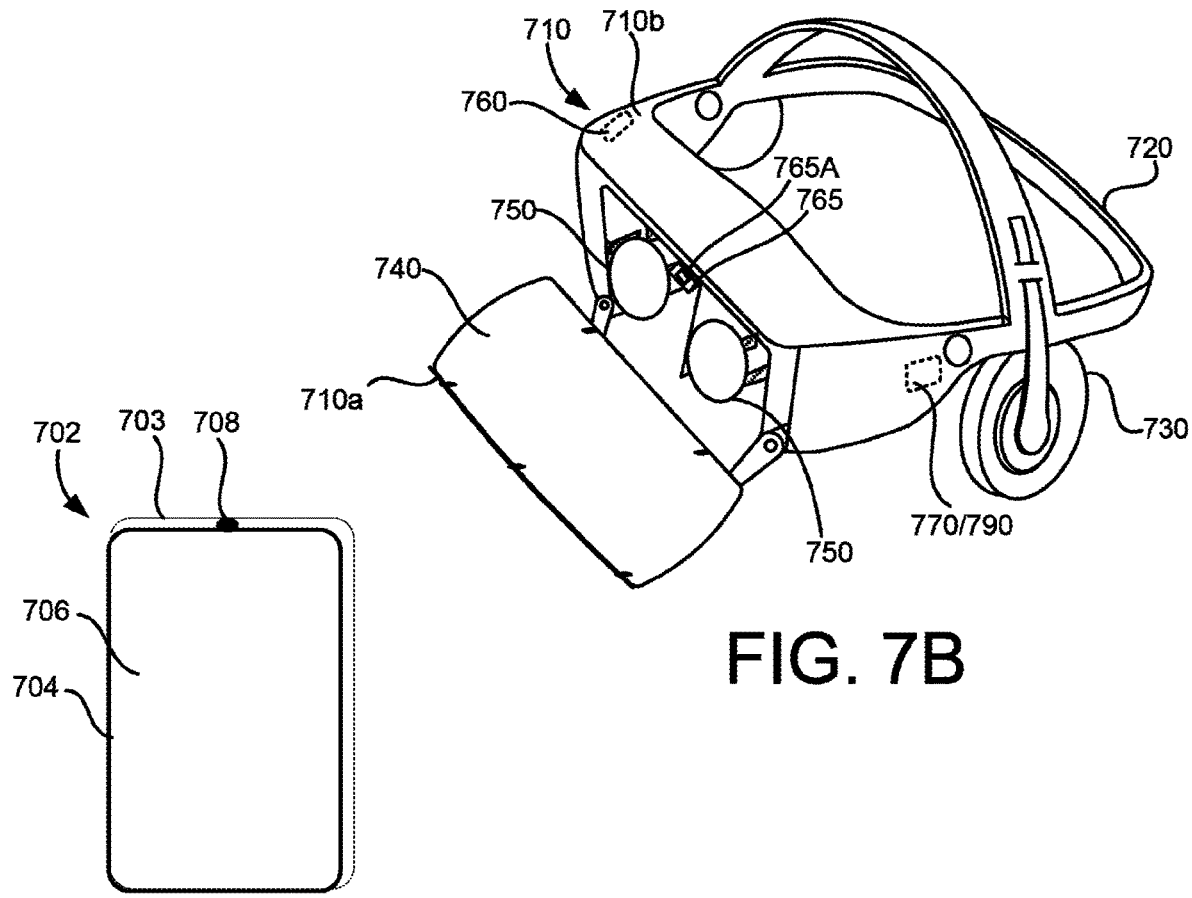
FIG. 7B
FIG. 7C

DISPLAYING AND INTERACTING WITH SCANNED ENVIRONMENT GEOMETRY IN VIRTUAL REALITY

CROSS REFERENCE TO RELATED APPLICATION

This application claims priority to U.S. Provisional Application No. 62/364,548, filed on Jul. 20, 2016, the disclosure of which is incorporated herein by reference.

TECHNICAL FIELD

This description generally relates to head-mounted displays (HMDs) used in virtual reality (VR).

BRIEF DESCRIPTION OF THE DRAWINGS

FIGS. 4A and 4B are diagrams depicting another example scene within the electronic environment shown in FIG. 1.

FIGS. 7A-7C is a diagram depicting the example VR HMD and an example controller.

Like reference symbols in the various drawings indicate like elements.

DETAILED DESCRIPTION

A virtual reality (VR) system that generates a virtual environment includes a VR computing device, a controller, and a set of transmitters. The set of transmitters transmit electromagnetic signals from a set of locations in a room that scatter off the controller and are received by the VR computing device to locate the controller—and the human user holding the controller—within the room. The human user experiences the virtual environment by moving through the room with the controller.

The human user views the virtual environment via a head-mounted display (HMD). Because the HMD completely covers the eyes of the human user, the human user is unable to see the actual room about which the human user moves. This inability to see can lead to potentially hazardous situations, especially when a new object is placed in the room without the human user knowing. The human user can injure him/herself by coming into contact with such an unseen object.

Improved techniques of displaying a virtual environment in a HMD involve generating a lighting scheme within a virtual environment configured to reveal a real object in a room in the virtual environment in response to a distance between a user in the room and the real object decreasing while the user is immersed in the virtual environment. Such a lighting scheme protects a user from injury resulting from collision with real objects in a room while immersed in a virtual environment.

Figure 1:
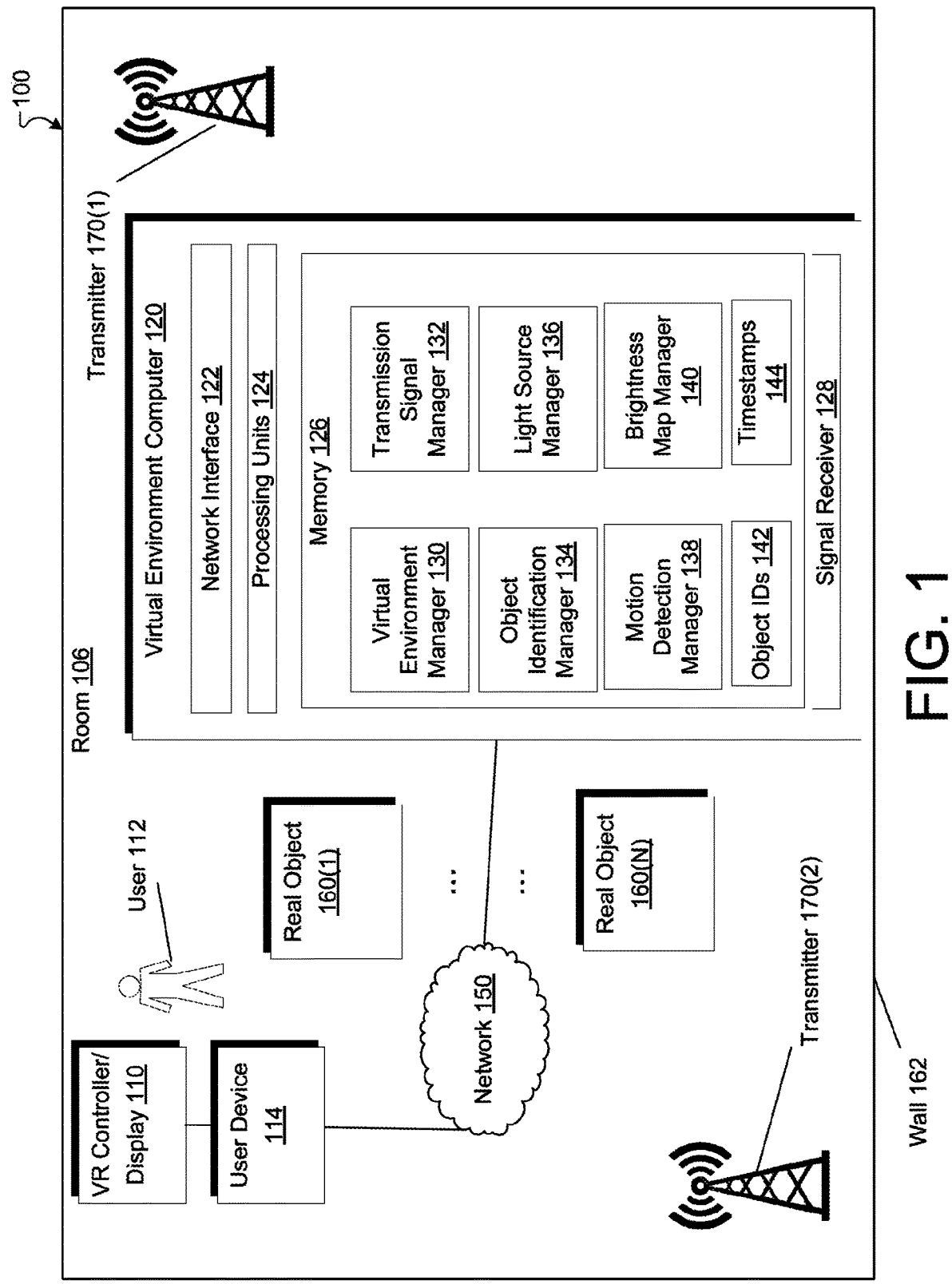
FIG. 1 is a block diagram of an example electronic environment for performing improved techniques of displaying a virtual environment in a HMD.

FIG. 1 is a block diagram depicting an example electronic environment 100 according to the improved techniques described herein. The electronic environment 100 includes a room 106. Within the room 106, there is a user 112 with a VR controller and display 110, a virtual environment computer 120, a network 150, real objects 160(1), ..., 160(N), and a pair of electromagnetic transmitters 170(1) and 170(2). In some arrangements, there may be only one transmitter. In other arrangements, there may be more than two transmitters.

The VR controller 110 may take the form of a head-mounted display (HMD) which is worn by the user 112 to provide an immersive virtual environment. In the example electronic environment 100, the user 112 that wears the VR controller 110 holds a user device, i.e., user device 114. The user device 114 may be, for example, a smartphone, a controller, a joystick, or another portable handheld electronic device(s) that may be paired with, and communicate with, the VR controller 110 for interaction in the immersive virtual environment. The user device 114 may be operably coupled with, or paired with the VR controller 110 via, for example, a wired connection, or a wireless connection such as, for example, a WiFi or Bluetooth connection. This pairing, or operable coupling, of the user device 114 and the VR controller 110 may provide for communication between the user device 114 and the VR controller 110 and the exchange of data between the user device 114 and the VR controller 110. This may allow the user device 114 to function as a controller in communication with the VR controller 110 for interacting in the immersive virtual environment. That is, a manipulation of the user device 114, such as, for example, a beam or ray emitted by the user device 114 and directed to a virtual object or feature for selection, and/or an input received on a touch surface of the user device 114, and/or a movement of the user device 114, may be translated into a corresponding selection, or movement, or other type of interaction, in the immersive virtual environment provided by the VR controller 110.

The virtual environment computer 120 is configured to generate data for the immersive virtual environment and transmit that data to the user device 114 over the network 150. As illustrated in FIG. 1, the virtual environment computer 120 is implemented as a computer system that is in communication with the user device 114 over the network 150.

The virtual environment computer 120 includes a network interface 122, a set of processing units 124, memory 126, and a signal receiver 128. The network interface 122 includes, for example, Ethernet adaptors, Token Ring adaptors, and the like, for converting electronic and/or optical signals received from the network 150 to electronic form for use by the virtual environment computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the virtual environment computer 120 can be, or can include processors (e.g., processing units 124) configured to process instructions stored in the memory 126. Examples of such instructions as depicted in FIG. 1 include a virtual environment manager 130, a transmission signal manager 132, an object identification manager 134, a light source manager 136, a motion detection manager 138, and a brightness map manager 140.

The virtual environment manager 130 is configured to generate data to be realized as the immersive virtual environment by the VR controller 110. Examples of such data may include avatars that represent users and virtual objects with which the users interact via the avatars.

The transmission signal manager 132 is configured to map signals received from the transmitters 170(1) and 170(2) to positions of real objects 160(1), . . . , 160(N) in the room 106. For example, the real object 160(1) scatters electromagnetic radiation emitted by the transmitters 170(1) and 170(2) in various directions. The directions of the radiation captured by a receiver (e.g., the signal receiver 128) may indicate where the real object 160(1) is in the room 106.

The object identification manager 134 is configured to assign identifiers to the real objects 160(1), . . . , 160(N) and track the real objects 160(1), . . . , 160(N) over time. For example, in response to a new real object being introduced into the room during operation of the virtual environment computer 120—the new real object being detected via the transmission signal manager 132—the object identification manager 134 assigns an identifier to the new real object. Further, the object identification manager 134 maintains this identifier as the new real object moves in the room 106.

The light source manager 136 is configured to generate light from an avatar of the user 112 to provide a view of a real object, e.g., real object 160(1) in the direct line of movement of the user 112 in the virtual environment. In many arrangements, the light from the light source, as it appears in the virtual environment, may be white light as in a flashlight. In one arrangement, the light source manager 136 provides the light source at hands of the avatar. In another arrangement, the light source manager 136 provides the light source at head of the avatar.

The motion detection manager 138 is configured to detect a change of position of any of the real objects 160(1), . . . , 160(N) and compute the velocity of that real object at an instant of time with respect to the user 112. The motion detection manager 138 is also configured to alert the user 112 according to the magnitude of the velocity, i.e., the likelihood of a danger of collision. In one implementation, the motion detection manager 138 computes the velocity by analyzing a change in distance between the real object 160(1) and the user 112 between frames of video as displayed within the VR controller 110.

The brightness map manager 140 is configured to produce a brightness map of scattered light in the virtual environment representing a real object, e.g., real object 160(1) in response to the light produced by the light source manager 136. Further, the brightness map manager 140 is configured to scale the brightness of the regions in the map according to the velocity of the real object 160(1), the likelihood of a danger of collision.

It should be noted that a brightness map produced by the brightness map manager 140 is a construct within the virtual environment. The brightness map so produced is within the virtual environment at a location indicative of the location of the real object within the room. The brightness map manager 140 produces the brightness map in response to a distance in the room between the user 112 and the real object 160(1) decreasing while the user 112 is immersed in the virtual environment.

In some implementations, an amount of reveal is controlled by the user either by distance or by direction of the user head/controller towards scanned surfaces. A light source in a graphics engine, e.g., the light source manager 136, may calculate (e.g., via the brightness map manager 140) the amount of reveal based on light reflected back towards the user 112 along a surface normal. In that manner, when the distance between a user and the real object 160(1) is greater than a threshold amount, the amount of reveal is hardly noticeable to the user, thus avoiding detraction from the visual presentation of the virtual environment.

The memory 126 may also store various data passed by the processors into routines realized by the instructions. As depicted in FIG. 1, such data include object identifiers 142 and timestamps 144. In some implementations, the object identifiers 142 are numerical values assigned to the real objects 160(1), . . . , 160(N) upon detection. The timestamps 144 are numerical values corresponding to a time at which the real objects 160(1), . . . , 160(N) were created.

The network 150 is configured and arranged to provide network connections between the VR controller 110 and the virtual environment computer 120. The network 150 may implement any of a variety of protocols and topologies that are in common use for communication over the Internet or other networks. Further, the network 150 may include various components (e.g., cables, switches/routers, gateways/bridges, etc.) that are used in such communications.

Each of the real objects, e.g., real object 160(1) is a material thing in the room 106 with which the user 112 is at risk of colliding. The real object 160(1) may be inanimate or alive, may be in motion or not, and may have been in the room when the user 112 began immersion in the virtual environment or not. Included among the real objects 160(1), . . . , 160(N) is a wall 162 of the room 106.

The transmitters 170(1) and 170(2) are each configured to generate and transmit electromagnetic radiation in the room 106. The electromagnetic radiation is tuned (i.e., has a wavelength range) so that it may be scattered by the real objects 160(1), . . . , 160(N).

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the virtual environment computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the virtual environment computer 120.

In some implementations, the virtual environment computer 120 can be, for example, a wired device and/or a wireless device (e.g., WiFi enabled device) and can be, for example, a computing entity (e.g., a personal computing device), a server device (e.g., a web server), a mobile phone, a touchscreen device, a personal digital assistant (PDA), a laptop, a television, a tablet device, e-reader, and/or so forth. Such device(s) can be configured to operate based on one or more platforms (e.g., one or more similar or different platforms) that can include one or more types of hardware, software, firmware, operating systems, runtime libraries, and/or so forth.

The components (e.g., modules, processing units 124) of the virtual environment computer 120 can be configured to operate based on one or more platforms (e.g., one or more similar or different platforms) that can include one or more types of hardware, software, firmware, operating systems, runtime libraries, and/or so forth. In some implementations, the components of the virtual environment computer 120 can be configured to operate within a cluster of devices (e.g., a server farm). In such an implementation, the functionality and processing of the components of the virtual environment computer 120 can be distributed to several devices of the cluster of devices.

The components of the virtual environment computer 120 can be, or can include, any type of hardware and/or software configured to process attributes. In some implementations, one or more portions of the components shown in the components of the virtual environment computer 120 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the virtual environment computer 120 can be, or can include, a software module configured for execution by at least one processor (not shown). In some implementations, the functionality of the components can be included in different modules and/or different components than those shown in FIG. 1.

Although not shown, in some implementations, the components of the virtual environment computer 120 (or portions thereof) can be configured to operate within, for example, a data center (e.g., a cloud computing environment), a computer system, one or more server/host devices, and/or so forth. In some implementations, the components of the virtual environment computer 120 (or portions thereof) can be configured to operate within a network. Thus, the components of the virtual environment computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Figure 2:
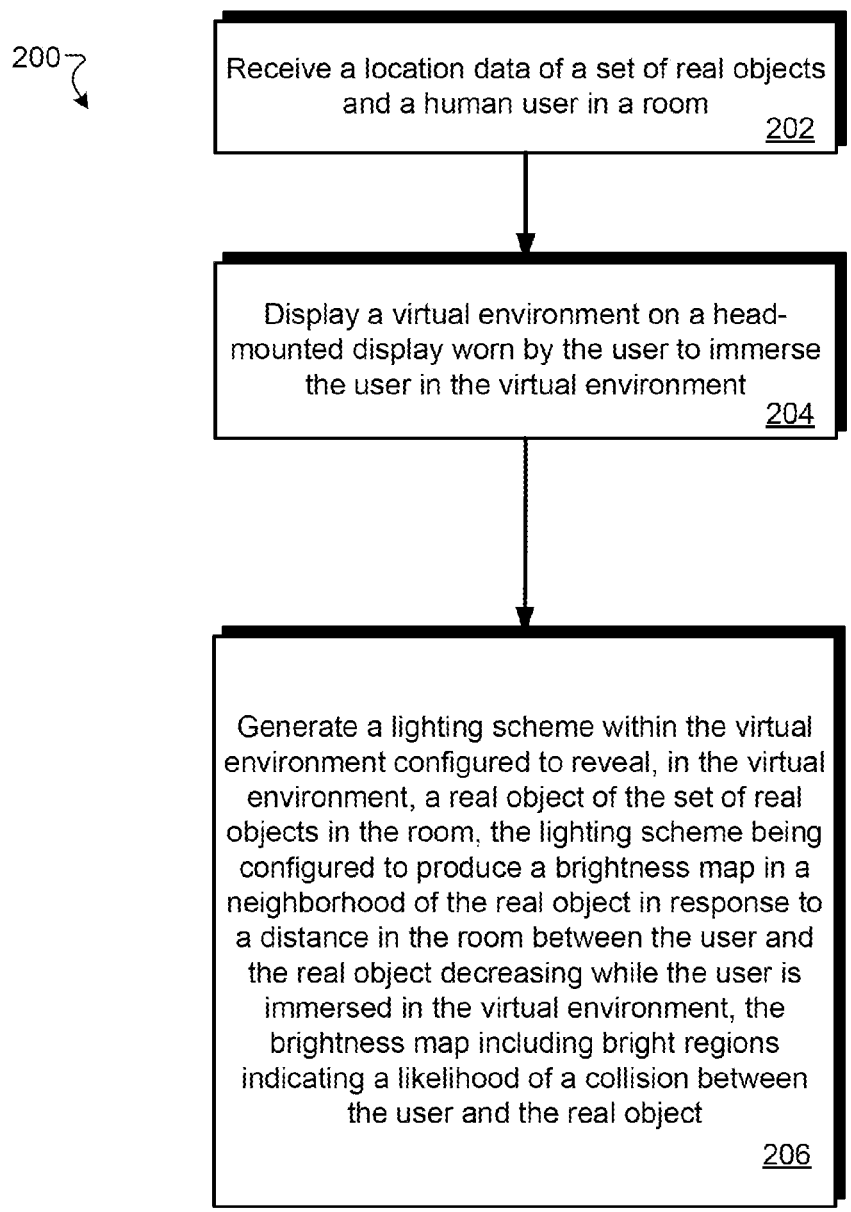
FIG. 2 is a flow chart depicting an example method of displaying a virtual environment in a HMD according to the improved techniques.

FIG. 2 is a flow chart depicting an example method 200 of displaying a virtual environment in a HMD. The method 200 may be performed by software constructs described in connection with FIG. 1, which reside in memory 126 of the virtual environment computer 120 and are run by the set of processing units 124.

At 202, the virtual environment computer 120 receives location data of a set of real objects and a human user in a room. In one example, when the transmitters 170(1) and 170(2) transmit electromagnetic radiation in the room 106, the real object 160(1) scatters the radiation from each of the transmitters 170(1) and 170(2). The virtual environment computer 120 receives at least some of that scattered radiation. The transmission signal manager 132 may then map the intensity and phase of the received radiation signal to a position and orientation of the real object 160(1). In another example, the controller 110 has a pass-through camera that captures images of the real object 160(1) in the room 106.

At 204, the virtual environment computer 120 displays a virtual environment on a HMD worn by the user to immerse the user in the virtual environment. For example, the virtual environment computer 120 sends data to the VR controller 110 that defines the virtual environment in which the user 112 is immersed. Note that while the user 112 is immersed in the virtual environment, the user 112 is unable to see the real objects 160(1), . . . , 160(N) in the room 106.

At 206, the virtual environment computer 120 generates a lighting scheme within the virtual environment configured to reveal, in the virtual environment, a real object of the set of real objects in the room. The lighting scheme is configured to produce a brightness map in a neighborhood of the real object in response to a distance in the room between the user and the real object decreasing while the user is immersed in the virtual environment. For example, the lighting scheme can produce a brightness map at a location within the virtual environment indicative of the location of the real object within the room in response to a distance in the room between the user and the real object decreasing while the user is immersed in the virtual environment.

For example, suppose that the user 112 is operating the VR controller 110 in the room 106 as part of a VR application such as a game. The user 112 will see a virtual environment that contains virtual objects, an avatar representing the user, and other details that define the virtual environment (e.g., walkways, walls, ceilings, and so on). However, when the VR controller 110 includes an HMD, the real objects 160(1), . . . , 160(N) in the room 106 are completely obscured from the user 112. Along these lines, if the user 112 moves quickly toward the wall 162, the user 112 will likely collide with the wall 162 and suffer an injury as a consequence.

Figure 3A:
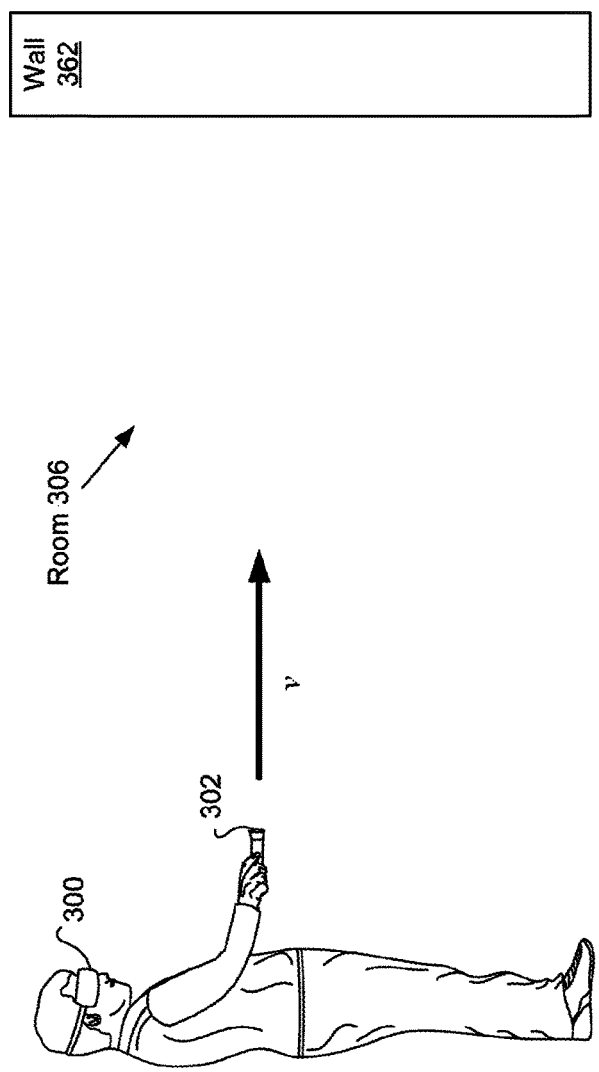
FIGS. 3A and 3B are diagrams depicting an example scene within the electronic environment shown in FIG. 1.

FIG. 3A is a diagram depicting an example of the above-described situation. In FIG. 3A, a user immersed in a virtual environment wears a HMD 300 and operates a handheld controller 302 in a room 306 (similarly configured as the room 106 in FIG. 1). During an example operation of the virtual environment computer 120 (FIG. 1), the user moves through the room in a straight line at a constant speed v toward a wall 362 of the room 306. In a conventional displaying of a virtual environment in the HMD 300, the user would likely collide with the wall 362 and suffer an injury.

Figure 3B:
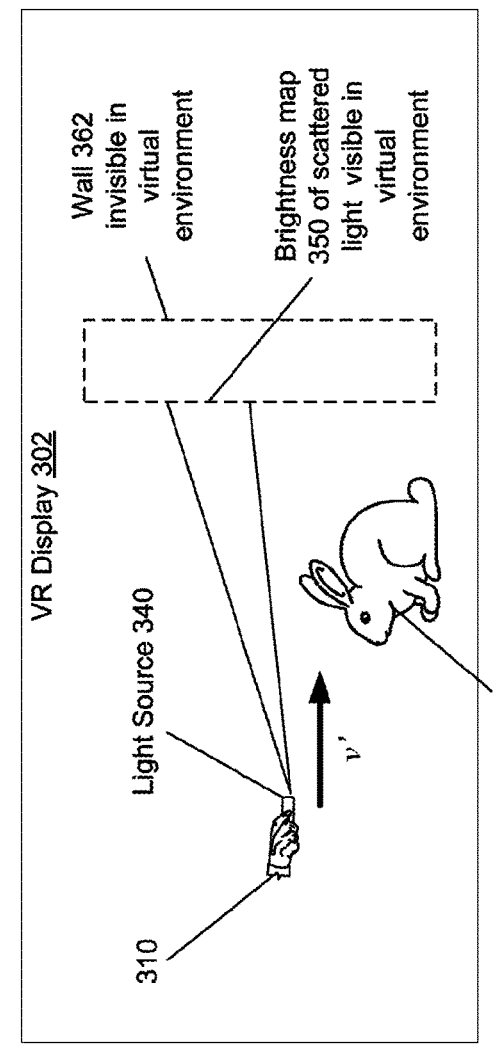

FIG. 3B is a diagram depicting a display 302 according to the above-described improved techniques of displaying the virtual environment. Within the display 302, the user may see an avatar 310 representing him/herself and a virtual object 330 (here, a cute little bunny rabbit) that is in reality not present in the room 306. The avatar 310 is moving at a speed v' within the virtual environment as displayed in the VR display 302.

However, the wall 362, a real object in the room 306, is invisible within the virtual environment and is not visible on the display 302. Thus, as the avatar 310 moves at speed v' through the virtual environment, the user may not be aware that in the real world (s)he is moving through the room 306 at speed v toward the wall 362.

Nevertheless, in response to the distance between the user and the wall 362 decreasing in the room 306, the light source manager 136 (FIG. 1) generates light from a virtual light source 340. As depicted in FIG. 3B, the light source 340 is located at a hand of the user. The light source 340 acts as a flashlight of sorts and produces a beam of light in the virtual environment. The beam of light so produced will show a brightness map 350 of scattered light visible in the virtual environment. In this way, the display 302 will reveal the real object 362 or at least a portion of the real object in the room according to where electromagnetic radiation is scattered by the real object 362.

In some implementations, the user 112 may rotate the light source 340 to search for real objects in the room.

Note that the distance between the user and the wall 362 at any given instant of time is determined by the motion detection manager 138 (FIG. 1). The motion detection manager 138 monitors distances between the user and the real objects in the room 306, e.g., the wall 362. The distances in turn are derived from output from the transmission signal manager 132 (FIG. 1). The transmission signal manager 132 generates coordinates of the real objects based on received scattered radiation signals from the transmitters 170(1) and 170(2) (FIG. 1).

In this way, the motion detection manager 138 triggers the light source manager 136 to generate light when the distance between the user and the wall 362 decreases in the room 306. In some implementations, the motion detection manager 138 triggers the light source manager when the rate of decrease of that distance is greater than a threshold amount (e.g., 1 m/sec).

Further, the object identification manager 134 (FIG. 1) maps the detected location of the object within the room 306 to a location in the virtual environment. For example, the location of the wall 362 in the virtual environment may be the location of the avatar 310 in the virtual environment plus a scale factor times the distance between the user and the wall 362 in the room 306.

When the light produced by the light source 340 reaches the location in the virtual environment corresponding to where the object identification manager 134 has determined the wall 362 to be, the brightness map manager 140 (FIG. 1) produces a brightness map 350 of the scattered light visible in the virtual environment to the user. The brightness map 350 indicates to the user that (s)he is approaching the wall 362. In some implementations, the brightness map 350 uses color to indicate the danger of collision (i.e., the rate of decrease of distance from the user), e.g., bright red indicates imminent collision, dark blue represents the user being a long way from the wall 362. The brightness map 350 may also reveal the outline of the wall 362 to the user so that the user may identify the wall 362.

Because the wall 362 is an extended object and the light produced from the light source 340 includes a finite-sized beam, the brightness map 350 will be brightest in a direct line between the wall 362 and the user. The brightness (or color) changes away from this direct line, i.e., the brightness decreases or the color transitions from bright red to dark blue according to a color map.

FIG. 4A is a diagram depicting an example scene in which a new real object 410 (here, a very comfy-looking sofa) is newly placed into the room 306 while the user is immersed in the virtual environment. Such a scenario is even more dangerous than that described in FIG. 3 because, while the user might remember where the wall is, the user has no memory of the newly placed object 410.

FIG. 4B is a diagram depicting the display 302 as in FIG. 3B. Again, normally the object 410 is invisible to the user while the user is immersed in the virtual environment. The newly-placed object 410 would then represent a real danger to the user as the user in this case has no idea of the existence of the object 410, and even if (s)he is aware of the existence, the user has no memory of where the object 410 is within the room 306.

Again, as before, the distance between the user and the object 410 at any given instant of time is determined by the motion detection manager 138 (FIG. 1). The motion detection manager 138 monitors distances between the user and the real objects in the room 306, e.g., the object 410. The distances in turn are derived from output from the transmission signal manager 132 (FIG. 1). The transmission signal manager 132 generates coordinates of the real objects based on received scattered radiation signals from the transmitters 170(1) and 170(2) (FIG. 1).

In this way, as discussed above, the motion detection manager 138 triggers the light source manager 136 to generate light when the distance between the user and the object 410 decreases in the room 306. In some implementations, the motion detection manager 138 triggers the light source manager when the rate of decrease of that distance is greater than a threshold amount (e.g., 1 m/sec).

Further, as discussed above, the object identification manager 134 (FIG. 1) maps the detected location of the object within the room 306 to a location in the virtual environment. For example, the location of the object 410 in the virtual environment may be the location of the avatar 310 in the virtual environment plus a scale factor times the distance between the user and the wall 362 in the room 306.

However, when the object 410 is placed in the room, the object identification manager 134 obtains a timestamp 144 corresponding to the time at which the object 410 is placed in the room 306. The timestamp 144 indicates the special risk to the user posed by recently placed objects such as object 410.

When the light produced by the light source 340 reaches the location in the virtual environment where the object identification manager 134 has determined the object 410 to be, the brightness map manager 140 (FIG. 1) produces a brightness map 430 in the virtual environment visible to the user. The brightness map 430 indicates to the user that (s)he is approaching the object 410. In some implementations, the brightness map 350 uses color to indicate the danger of collision (i.e., the rate of decrease of distance from the user), e.g., bright red indicates imminent collision, dark blue represents the user being a long way from the object 410. The brightness map 350 may also reveal the outline of the object 410 to the user so that the user may identify the object 410. Because the object 410 is an extended object and the light produced from the light source 340 includes a finite-sized beam, the brightness map 430 will be brightest in a direct line between the object 410 and the user. The brightness (or color) changes away from this direct line, i.e., the brightness decreases or the color transitions from bright red to dark blue according to a color map.

Further, the brightness map manager 140 may also scale the color map and/or the brightness according to the timestamp 144 corresponding to the object 410. In some implementations, the motion detection manager 138 may trigger the light source 340 when the timestamp indicates a time earlier than some threshold time (i.e., when the object 410 is newly placed), regardless of a rate of change of distance between the user and the object 410.

Figure 5:
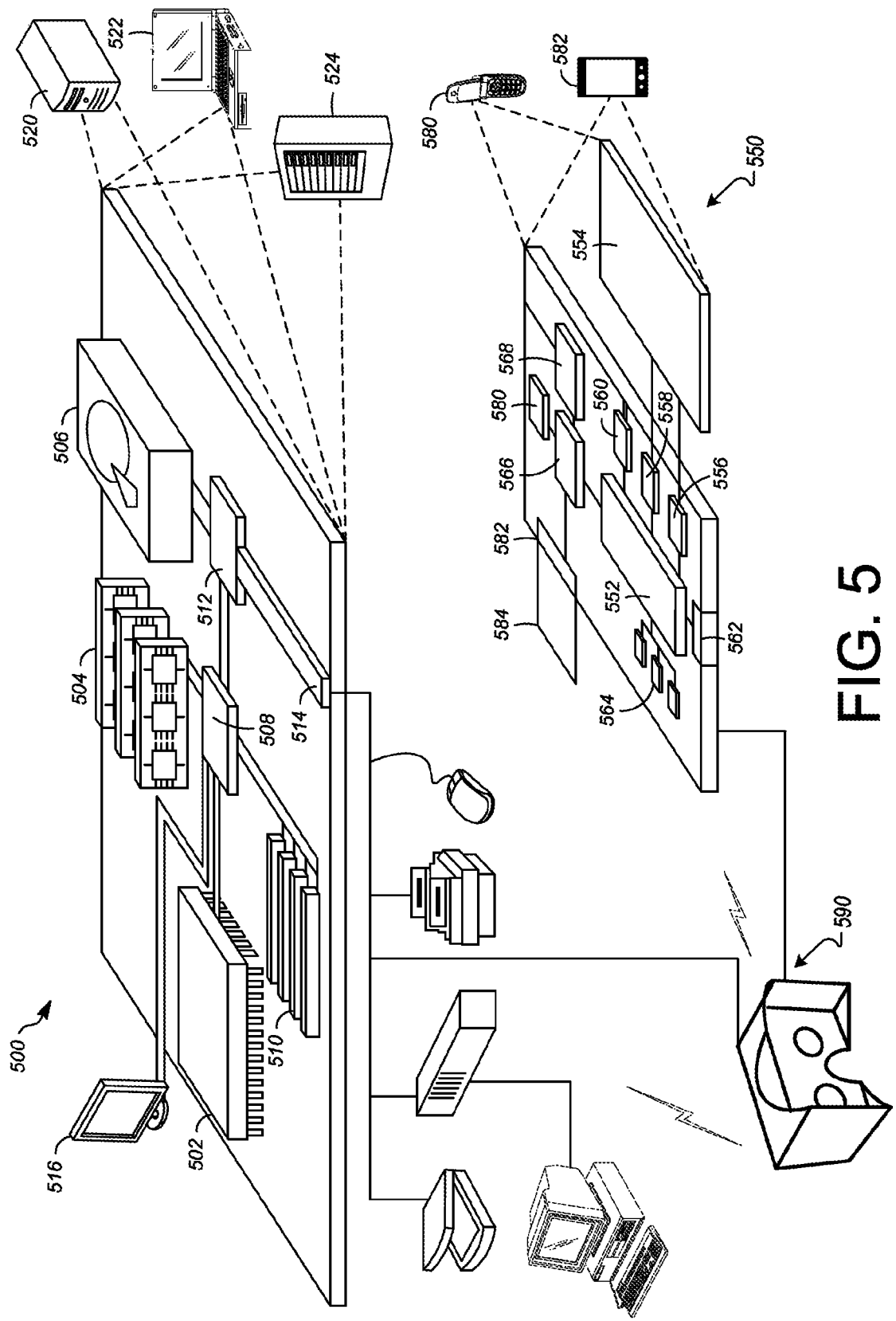
FIG. 5 is a diagram depicting an example of a computer device that can be used to implement the improvement described herein.

FIG. 5 shows an example of a generic computer device 500 and a generic mobile computer device 550, which may be used with the techniques described here in the context of applications involving VR. Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 850, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (VR headset 590). For example, one or more sensors included on a computing device 550 or other computing device depicted in FIG. 5, can provide input to VR headset 590 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 550 can use the sensors to determine an absolute position and/or a detected rotation of the computing device in the VR space that can then be used as input to the VR space. For example, the computing device 550 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 550 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 550 when the computing device is incorporated into the VR space can cause a particular action to occur in the VR space.

In some implementations, a touchscreen of the computing device 550 can be rendered as a touchpad in VR space. A user can interact with the touchscreen of the computing device 550. The interactions are rendered, in VR headset 590 for example, as movements on the rendered touchpad in the VR space. The rendered movements can control objects in the VR space.

In some implementations, one or more output devices included on the computing device 550 can provide output and/or feedback to a user of the VR headset 590 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 550 may appear as another object in a computer-generated, 3D environment. Interactions by the user with the computing device 550 (e.g., rotating, shaking, touching a touchscreen, swiping a finger across a touch screen) can be interpreted as interactions with the object in the VR space. In the example of the laser pointer in a VR space, the computing device 550 appears as a virtual laser pointer in the computer-generated, 3D environment. As the user manipulates the computing device 550, the user in the VR space sees movement of the laser pointer. The user receives feedback from interactions with the computing device 850 in the VR space on the computing device 550 or on the VR headset 590.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Figure 6:
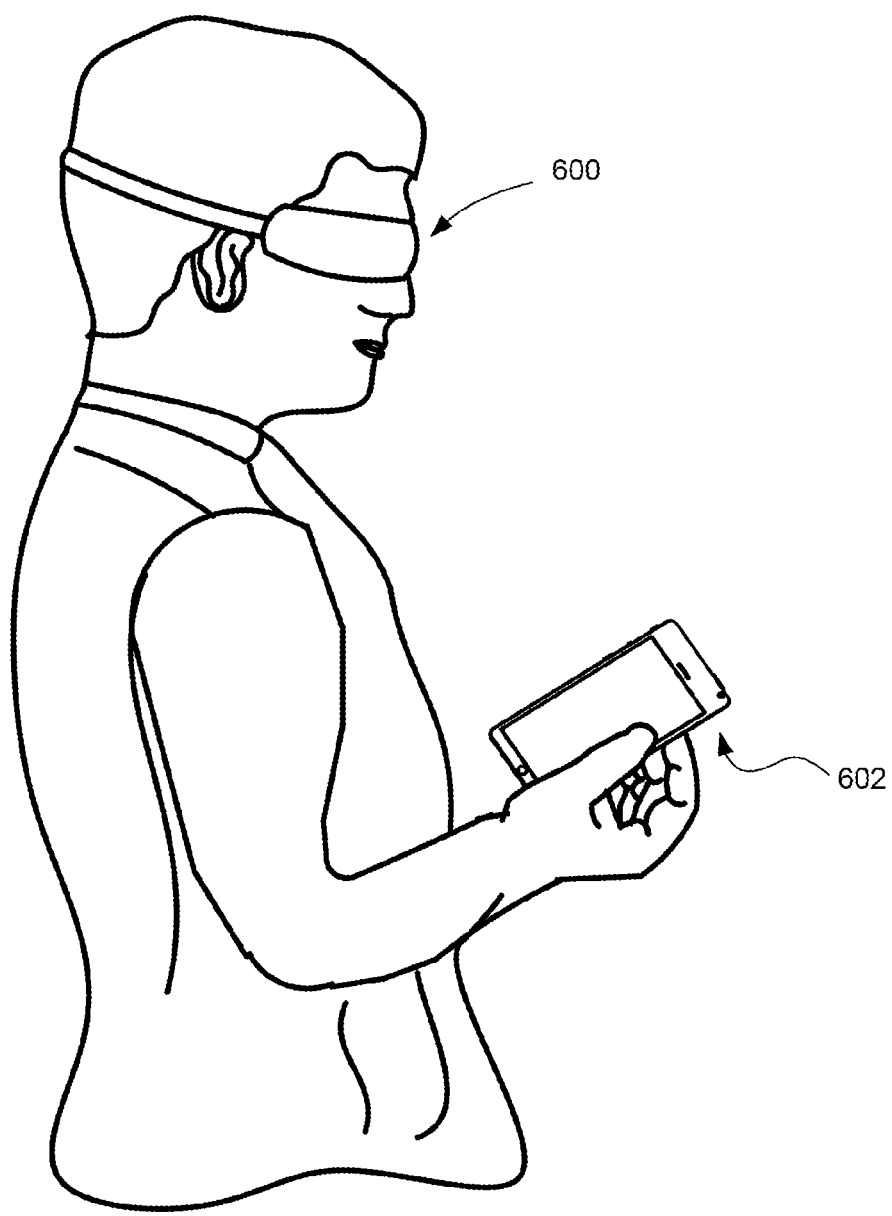
FIG. 6 is a diagram depicting an example HMD for use in a virtual reality (VR) environment.

FIG. 6 illustrates an example implementation of a head-mounted display as shown in FIGS. 3 and 4. In FIG. 6, a user wearing an HMD 600 is holding a portable handheld electronic device 602. The handheld electronic device 602 may be, for example, a smartphone, a controller, a joystick, or another portable handheld electronic device(s) that may be paired with, and communicate with, the HMD 600 for interaction in the immersive virtual environment generated by the HMD 600. The handheld electronic device 602 may be operably coupled with, or paired with the HMD 600 via, for example, a wired connection, or a wireless connection such as, for example, a WiFi or Bluetooth connection. This pairing, or operable coupling, of the handheld electronic device 602 and the HMD 600 may provide for communication between the handheld electronic device 602 and the HMD 600 and the exchange of data between the handheld electronic device 602 and the HMD 600. This may allow the handheld electronic device 602 to function as a controller in communication with the HMD 600 for interacting in the immersive virtual environment generated by the HMD 600. That is, a manipulation of the handheld electronic device 602, such as, for example, a beam or ray emitted by the handheld electronic device 602 and directed to a virtual object or feature for selection, and/or an input received on a touch surface of the handheld electronic device 602, and/or a movement of the handheld electronic device 602, may be translated into a corresponding selection, or movement, or other type of interaction, in the immersive virtual environment generated by the HMD 600. For example, the HMD 600, together with the handheld electronic device 602, may generate a virtual environment as described above, and the handheld electronic device 602 may be manipulated to effect a change in scale, or perspective, of the user relative to the virtual features in the virtual environment as described above.

FIGS. 7A and 7B are perspective views of an example HMD, such as, for example, the HMD 600 worn by the user in FIG. 6, and FIG. 7C illustrates an example handheld electronic device, such as, for example, the handheld electronic device 602 shown in FIG. 6.

The handheld electronic device 702 may include a housing 703 in which internal components of the device 702 are received, and a user interface 704 on an outside of the housing 703, accessible to the user. The user interface 704 may include a touch sensitive surface 706 configured to receive user touch inputs. The user interface 704 may also include other components for manipulation by the user such as, for example, actuation buttons, knobs, joysticks and the like. In some implementations, at least a portion of the user interface 704 may be configured as a touchscreen, with that portion of the user interface 704 being configured to display user interface items to the user, and also to receive touch inputs from the user on the touch sensitive surface 706. The handheld electronic device 702 may also include a light source 708 configured to selectively emit light, for example, a beam or ray, through a port in the housing 703, for example, in response to a user input received at the user interface 704.

The HMD 700 may include a housing 710 coupled to a frame 720, with an audio output device 730 including, for example, speakers mounted in headphones, also be coupled to the frame 720. In FIG. 7B, a front portion 710a of the housing 710 is rotated away from a base portion 710b of the housing 710 so that some of the components received in the housing 710 are visible. A display 740 may be mounted on an interior facing side of the front portion 710a of the housing 710. Lenses 750 may be mounted in the housing 710, between the user's eyes and the display 740 when the front portion 710a is in the closed position against the base portion 710b of the housing 710. In some implementations, the HMD 700 may include a sensing system 760 including various sensors and a control system 770 including a processor 790 and various control system devices to facilitate operation of the HMD 700.

In some implementations, the HMD 700 may include a camera 780 to capture still and moving images. The images captured by the camera 780 may be used to help track a physical position of the user and/or the handheld electronic device 702 in the real world, or physical environment relative to the virtual environment, and/or may be displayed to the user on the display 740 in a pass through mode, allowing the user to temporarily leave the virtual environment and return to the physical environment without removing the HMD 700 or otherwise changing the configuration of the HMD 700 to move the housing 710 out of the line of sight of the user.

In some implementations, the HMD 700 may include a gaze tracking device 765 to detect and track an eye gaze of the user. The gaze tracking device 765 may include, for example, an image sensor 765A, or multiple image sensors 765A, to capture images of the user's eyes, for example, a particular portion of the user's eyes, such as, for example, the pupil, to detect, and track direction and movement of, the user's gaze. In some implementations, the HMD 700 may be configured so that the detected gaze is processed as a user input to be translated into a corresponding interaction in the immersive virtual experience.

Further implementations are summarized in the following examples:

Example 1

A computer-implemented method, the method comprising: receiving location data of a set of real objects and a human user in a room; displaying a virtual environment on a head-mounted display worn by the user to immerse the user in the virtual environment; and generating a lighting scheme within the virtual environment configured to reveal, in the virtual environment, a real object of the set of real objects at a location in the room, the lighting scheme being configured to produce a brightness map at a location within the virtual environment indicative of the location of the real object within the room in response to a distance in the room between the user and the real object decreasing while the user is immersed in the virtual environment.

Example 2

The computer-implemented method as in example 1, wherein generating the lighting scheme includes providing an avatar of the user with a light source, and wherein the brightness map indicates a brightness of light produced by the light source and scattered off the real object.

Example 3

The computer implemented method as in example 2, wherein the avatar of the user includes a representation of a controller held by the user in the room, and wherein providing the avatar of the user with the light source includes generating light from the controller.

Example 4

The computer implemented method as in example 2, wherein the avatar of the user includes a representation of a head of the user, and wherein providing the avatar of the user with the light source includes generating light from the head of the user.

Example 5

The computer-implemented method as in one of examples 1 to 4, further comprising storing a timestamp associated with the real object, the timestamp indicating a time at which the real object was introduced into the room.

Example 6

The computer-implemented method as in example 5, wherein the brightness map indicates the time at which the real object was introduced into the room, the bright regions of the brightness map being bright in response to the timestamp indicating a recent time.

Example 7

The computer-implemented method as on one of examples 1 to 6, further comprising producing the brightness map in response to the real object moving toward the user at a measured velocity.

Example 8

The computer-implemented method as in example 7, wherein the bright regions of the brightness map indicate places where the real object is moving at a velocity greater than a threshold.

Example 9

A system comprising: a set of transmitters; a head-mounted display worn by a human user; and a computer including a network interface, memory, and controlling circuitry coupled to the memory, the controlling circuitry being configured to: receive, from the set of transmitters, location data of a set of real objects and a human user in a room; display a virtual environment on the head-mounted display worn by the human user to immerse the user in the virtual environment; and generate a lighting scheme within the virtual environment configured to reveal, in the virtual environment, a real object of the set of real objects at a location in the room, the lighting scheme being configured to produce a brightness map at a location within the virtual environment indicative of the location of the real object within the room in response to a distance in the room between the user and the real object decreasing while the user is immersed in the virtual environment.

Example 10

A computer program product comprising a nontransitive storage medium, the computer program product including code that, when executed by processing circuitry of a computer, causes the processing circuitry to perform a method, the method comprising: receiving location data of a set of real objects and a human user in a room; displaying a virtual environment on a head-mounted display worn by the user to immerse the user in the virtual environment; and generating a lighting scheme within the virtual environment configured to reveal, in the virtual environment, a real object of the set of real objects at a location in the room, the lighting scheme being configured to produce a brightness map at a location within the virtual environment indicative of the location of the real object within the room in response to a distance in the room between the user and the real object decreasing while the user is immersed in the virtual environment.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, the method comprising:
   receiving location data of a set of real objects and a human user in a room;
   displaying a virtual environment on a head-mounted display worn by the user to immerse the user in the virtual environment; and
   generating a lighting scheme within the virtual environment configured to reveal, in the virtual environment, a real object of the set of real objects at a location in the room, the lighting scheme being configured to provide a representation of the real object at a location in the virtual environment in response to a distance in the room between the user and the real object decreasing while the user is immersed in the virtual environment, the location of the representation of the real object in the virtual environment being a virtual distance from an avatar of the user, the virtual distance being scaled based on the distance between the user and the real object, wherein the generating the lighting scheme within the virtual environment includes:
  generating, within the virtual environment, a light in the location of the representation of the real object in the virtual environment, the light having a parameter with a value that indicates a risk of imminent collision between the user and the real object, wherein the value of the parameter is a color that varies away from a direct line between the representation of the real object in the virtual environment and the avatar of the user.

2. The computer-implemented method as in claim 1, wherein generating the lighting scheme includes providing the avatar of the user with a virtual light source in the virtual environment.

3. The computer implemented method as in claim 2, wherein the avatar of the user includes a representation of a controller held by the user in the room, and
  wherein providing the avatar of the user with the virtual light source in the virtual environment includes generating the light from the representation of the controller.

4. The computer implemented method as in claim 2, wherein the avatar of the user includes a representation of a head of the user, and
  wherein providing the avatar of the user with the light source includes generating the light from the representation of the head of the user.

5. The computer-implemented method as in claim 1, further comprising storing a timestamp associated with the real object, the timestamp indicating a time at which the real object was introduced into the room.

6. The computer-implemented method as in claim 1, further comprising providing the representation of the real object at the location in the virtual environment in response to the real object moving toward the user at a measured velocity.

7. The computer-implemented method as in claim 1, wherein providing the representation of the real object at the location in the virtual environment in response to the real object moving at a velocity greater than a threshold.

8. The method as in claim 1, wherein the value of the parameter is a color that varies with the virtual distance.

9. A system comprising:
  a set of transmitters;
  a head-mounted display worn by a human user; and
  a computer including a network interface, memory, and controlling circuitry coupled to the memory, the controlling circuitry being configured to:
    receive, from the set of transmitters, location data of a set of real objects and the human user in a room;
    display a virtual environment on the head-mounted display worn by the human user to immerse the user in the virtual environment; and
    generate a lighting scheme within the virtual environment configured to reveal, in the virtual environment, a real object of the set of real objects at a location in the room, the lighting scheme being configured to provide a representation of the real object at a location in the virtual environment in response to a distance in the room between the user and the real object decreasing while the user is immersed in the virtual environment, the location of the representation of the real object in the virtual environment being a virtual distance from an avatar of the user, the virtual distance being scaled based on the distance between the user and the real object,
    wherein the controlling circuitry configured to generate the lighting scheme within the virtual environment is further configured to:
      generate, within the virtual environment, a light in the location of the representation of the real object in the virtual environment, the light having a parameter with a value that indicates a risk of imminent collision between the user and the real object, wherein the value of the parameter is a color that varies away from a direct line between the representation of the real object in the virtual environment and the avatar of the user.

10. The system as in claim 9, wherein the controlling circuitry configured to generate the lighting scheme is further configured to provide the avatar of the user with a virtual light source in the virtual environment.

11. The system as in claim 10, wherein the avatar of the user includes a representation of a controller held by the user in the room, and
  wherein the controlling circuitry configured to provide the avatar of the user with the virtual light source in the virtual environment is further configured to generate the light from the representation of the controller.

12. The system as in claim 10, wherein the avatar of the user includes a representation of a head of the user, and
  wherein the controlling circuitry configured to provide the avatar of the user with the light source is further configured to generate the light from the representation of the head of the user.

13. A computer program product comprising a non-transitory storage medium, the computer program product including code that, when executed by processing circuitry of a computer, causes the processing circuitry to perform a method, the method comprising:
  receiving location data of a set of real objects and a human user in a room;
  displaying a virtual environment on a head-mounted display worn by the user to immerse the user in the virtual environment; and
  generating a lighting scheme within the virtual environment configured to reveal, in the virtual environment, a real object of the set of real objects at a location in the room, the lighting scheme being configured to provide a representation of the real object at a location in the virtual environment in response to a distance in the room between the user and the real object decreasing while the user is immersed in the virtual environment, the location of the representation of the real object in the virtual environment being a virtual distance from an avatar of the user, the virtual distance being scaled based on the distance between the user and the real object,
  wherein the generating the lighting scheme within the virtual environment includes:
    generating, within the virtual environment, a light in the location of the representation of the real object in the virtual environment, the light having a parameter with a value that indicates a risk of imminent collision between the user and the real object, wherein the value of the parameter is a color that varies away from a direct line between the representation of the real object in the virtual environment and the avatar of the user.

14. The computer program product as in claim 13, wherein generating the lighting scheme includes providing the avatar of the user with a virtual light source in the virtual environment.

15. The computer program product as in claim 14, wherein the avatar of the user includes a representation of a controller held by the user in the room, and
    wherein providing the avatar of the user with the virtual light source in the virtual environment includes generating the light from the representation of the controller.

16. The computer program product as in claim 14, wherein the avatar of the user includes a representation of a head of the user, and
    wherein providing the avatar of the user with the light source includes generating the light from the representation of the head of the user.

17. The computer program product as in claim 13, wherein the method further comprises storing a timestamp associated with the real object, the timestamp indicating a time at which the real object was introduced into the room.

18. The computer program product as in claim 13, wherein the method further comprises providing the representation of the real object at the location in the virtual environment in response to the real object moving toward the user at a measured velocity.

19. The computer program product as in claim 13, wherein providing the representation of the real object at the location in the virtual environment in response to the real object moving at a velocity greater than a threshold.

\* \* \* \* \*